US012786747B2

(12) United States Patent
Vaishnavi

(10) Patent No.: US 12,786,747 B2
(45) Date of Patent: Nov. 3, 2026

(54) CHECKING A FEASIBILITY OF A GOAL FOR AUTOMATION

(71) Applicant: Lenovo (Singapore) Pte. Ltd., New Tech Park (SG)

(72) Inventor: Ishan Vaishnavi, Munich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 477 days.

(21) Appl. No.: 18/550,661

(22) PCT Filed: Mar. 15, 2022

(86) PCT No.: PCT/IB2022/052337

§ 371 (c)(1),
(2) Date: Sep. 14, 2023

(87) PCT Pub. No.: WO2022/195483

PCT Pub. Date: Sep. 22, 2022

(65) Prior Publication Data

US 2024/0147265 A1 May 2, 2024

Related U.S. Application Data

(60) Provisional application No. 63/161,363, filed on Mar. 15, 2021.

(51) Int. Cl.
*H04W 24/02* (2009.01)
*H04L 41/08* (2022.01)
*H04L 41/0866* (2022.01)

(52) U.S. Cl.
CPC ......... *H04W 24/02* (2013.01); *H04L 41/0866* (2013.01); *H04L 41/0883* (2013.01)

(58) Field of Classification Search
CPC ..... H04W 24/02; H04W 24/08; H04W 28/24; G16Y 40/10; G16Y 40/35; H04L 41/5009;

(Continued)

(56) References Cited

U.S. PATENT DOCUMENTS 7,865,597 B2 * 1/2011 Igelsias .................... H04L 41/00 709/224
8,655,824 B1 * 2/2014 Allen ...................... G06N 5/025 706/47

(Continued)

FOREIGN PATENT DOCUMENTS

CN 119012240 A * 11/2024 ............ H04W 84/08
EP 4009605 B1 9/2024

(Continued)

OTHER PUBLICATIONS

Translation of CN-119012240-A (Year: 2024).*

(Continued)

*Primary Examiner* — Matthew C Sams
(74) *Attorney, Agent, or Firm* — Kunzler Needham & Hilton; Bruce R. Needham

(57) ABSTRACT

Apparatuses, methods, and systems are disclosed for checking a feasibility of a goal for automation. One method includes receiving, at a network device, a request from a consumer device for checking a feasibility of a goal for automation in the telecommunication network. The method includes decomposing the goal into a set of configurable conditions, a set of subgoals, or a combination thereof. The method includes determining whether the set of configurable conditions, the set of subgoals, or the combination thereof are able to be set in the telecommunication network. The method includes transmitting a response to the consumer device based on whether the set of configurable conditions, the set of subgoals, or the combination thereof are able to be set in the telecommunication network.

20 Claims, 8 Drawing Sheets

(58) Field of Classification Search
CPC . H04L 41/0894; H04L 41/40; H04L 41/5025; H04L 41/5048; H04L 43/026; H04L 43/028; H04L 43/08; H04L 67/1008; H04L 67/1012; H04L 67/1023; H04L 41/0866; H04L 41/0883
See application file for complete search history.

(56) References Cited

U.S. PATENT DOCUMENTS

| | | | | |
|---|---|---|---|---|
| 11,159,609 | B2 * | 10/2021 | McGrath | G06F 9/5027 |
| 11,696,184 | B2 * | 7/2023 | Tiwari | H04L 41/5025 370/241 |
| 11,876,688 | B1 * | 1/2024 | Rehman | H04L 41/0894 |
| 2006/0069995 | A1 * | 3/2006 | Thompson | H04L 67/02 715/700 |
| 2012/0089959 | A1 * | 4/2012 | Park | G06F 9/5055 717/105 |
| 2013/0182700 | A1 * | 7/2013 | Figura | H04L 43/08 709/224 |
| 2015/0139441 | A1 * | 5/2015 | Kawalkar | H04M 3/42 381/82 |
| 2018/0309632 | A1 | 10/2018 | Kompella et al. | |
| 2019/0020553 | A1 * | 1/2019 | Rajagopal | H04L 41/40 |
| 2020/0005162 | A1 * | 1/2020 | Kattepur | B25J 9/1612 |
| 2020/0084830 | A1 * | 3/2020 | Liu | H04W 80/08 |
| 2020/0186411 | A1 | 6/2020 | Ravichandran et al. | |
| 2021/0028987 | A1 | 1/2021 | Krivenok | |
| 2022/0060388 | A1 * | 2/2022 | Li | H04L 41/0816 |

FOREIGN PATENT DOCUMENTS

| | | | |
|---|---|---|---|
| WO | 2019210675 | A1 | 11/2019 |
| WO | 2021017771 | A1 | 2/2021 |

OTHER PUBLICATIONS

PCT/IB2022/052337, "International Search Report and the Written Opinion of the International Searching Authority, or the Declaration", International Searching Authority, Jun. 7, 2022, pp. 1-13.

ETSI, "Zero-touch network and Service Management (ZSM); Reference Architecture", ETSI GS ZSM 002 V1.1.1, Aug. 2019, pp. 1-80.

ETSI, "Zero-touch network and Service Management (ZSM); Closed-Loop Automation; Part 1: Enablers", ETSI GS ZSM 009-1 V1.1.1, Jun. 2021, pp. 1-40.

ETSI, "Zero-touch Network and Service Management (XSM); End to end management and orchestration of network slicing", ETSI GS ZSM 330 V0.19.1, Sep. 2020, pp. 1-78.

3GPP, "3rd Generation Partnership Project; Technical Specification Group Services and System Aspects; Management and orchestration; Study on enhancement of Management Data Analytics (MDA) (Release 17)", 3GPP TR 28.809 V1.2.0, Feb. 2021, pp. 1-95.

3GPP, "3rd Generation Partnership Project; Technical Specification Group Services and System Aspects; Management and orchestration; Generic management services; (Release 16)", 3GPP TS 28.532 V16.6.0, Dec. 2020, pp. 1-232.

3GPP, "3rd Generation Partnership Project; Technical Specification Group Services and System Aspects; Management and orchestration; Management services for communication service assurance; Requirements (Release 17)", 3GPP TS 28.535 V17.0.0, Dec. 2020, pp. 1-19.

3GPP, "3rd Generation Partnership Project; Technical Specification Group Services and System Aspects; Management and orchestration; Management services for communication service assurance; Stage 2 and stage 3 (Release 16)", 3GPP TS 28.536 V16.2.1, Dec. 2020, pp. 1-25.

3GPP, "3rd Generation Partnership Project; Technical Specification Group Services and System Aspects; Management and orchestration; Performance assurance (Release 16)", 3GPP TS 28.550 V16.7.0, Dec. 2020, pp. 1-85.

3GPP, "3rd Generation Partnership Project; Technical Specification Group Services and System Aspects; Management and orchestration of networks and network slicing; Performance Management (PM); Stage 2 and stage 3 (Release 15)", 3GPP TS 28.551 V0.3.0, Jul. 2018, pp. 1-34.

3Gpp, "3rd Generation Partnership Project; Technical Specification Group Services and System Aspects; Telecommunication management; Generic Network Resource Model (NRM) Integration Reference Point (IRP); Information Service (IS) (Release 16)", 3GPP TS 28.622 V16.6.0, Dec. 2020, pp. 1-55.

SA5, "Presentation of Specification/Report to TSG: TS 28.531 Management and orchestration; Provisioning; Version 2.0.0", 3GPP TSG-SA Meeting #81 Tdoc SP-180806, Sep. 12-14, 2018, pp. 1-1.

SA WG5, "Presentation of Specification to TSG: TS 28.550 "Management and orchestration; Performance assurance", Version 2.0.0", 3GPP TSG-SA Meeting #82 Tdoc SP-181064, Dec. 12-14, 2018, pp. 1-1.

SA5, "Presentation of Specification/Report to TSG: TS 28.536, Version 1.0.0", 3GPP TSG-SA Meeting #88-e Tdoc SP-200479, Jun. 30-Jul. 3, pp. 1-1.

* cited by examiner

CHECKING A FEASIBILITY OF A GOAL FOR AUTOMATION

CROSS-REFERENCE TO RELATED APPLICATIONS

This application claims priority to U.S. Patent Application Ser. No. 63/161,363 entitled "APPARATUSES, METHODS, AND SYSTEMS FOR AUTOMATION GOAL FEASIBILITY CHECK" and filed on Mar. 15, 2021 for Ishan Vaishnavi, which is incorporated herein by reference in its entirety.

FIELD

The subject matter disclosed herein relates generally to wireless communications and more particularly relates to checking a feasibility of a goal for automation.

BACKGROUND

In certain wireless communications networks, goals may be set in a closed loop system. In such networks, different goals set by different consumers may conflict with each other.

BRIEF SUMMARY

Methods for checking a feasibility of a goal for automation are disclosed. Apparatuses and systems also perform the functions of the methods. One embodiment of a method includes receiving, at a network device, a request from a consumer device for checking a feasibility of a goal for automation in the telecommunication network. In some embodiments, the method includes decomposing the goal into a set of configurable conditions, a set of subgoals, or a combination thereof. In certain embodiments, the method includes determining whether the set of configurable conditions, the set of subgoals, or the combination thereof are able to be set in the telecommunication network. In various embodiments, the method includes transmitting a response to the consumer device based on whether the set of configurable conditions, the set of subgoals, or the combination thereof are able to be set in the telecommunication network.

One apparatus for checking a feasibility of a goal for automation includes a network device. In some embodiments, the apparatus includes a receiver that receives a request from a consumer device for checking a feasibility of a goal for automation in the telecommunication network. In various embodiments, the apparatus includes a processor that: decomposes the goal into a set of configurable conditions, a set of subgoals, or a combination thereof; and determines whether the set of configurable conditions, the set of subgoals, or the combination thereof are able to be set in the telecommunication network. In certain embodiments, the apparatus includes a transmitter that transmits a response to the consumer device based on whether the set of configurable conditions, the set of subgoals, or the combination thereof are able to be set in the telecommunication network.

Another embodiment of a method for checking a feasibility of a goal for automation includes transmitting, from a consumer device, a request to a network device for checking a feasibility of a goal for automation in the telecommunication network. The goal is decomposable into a set of configurable conditions, a set of subgoals, or a combination thereof. In some embodiments, the method includes receiving a response from the network device based on whether the set of configurable conditions, the set of subgoals, or the combination thereof are able to be set in the telecommunication network.

Another apparatus for checking a feasibility of a goal for automation includes a consumer device. In some embodiments, the apparatus includes a transmitter that transmits a request to a network device for checking a feasibility of a goal for automation in the telecommunication network. The goal is decomposable into a set of configurable conditions, a set of subgoals, or a combination thereof. In various embodiments, the apparatus includes a receiver that receives a response from the network device based on whether the set of configurable conditions, the set of subgoals, or the combination thereof are able to be set in the telecommunication network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
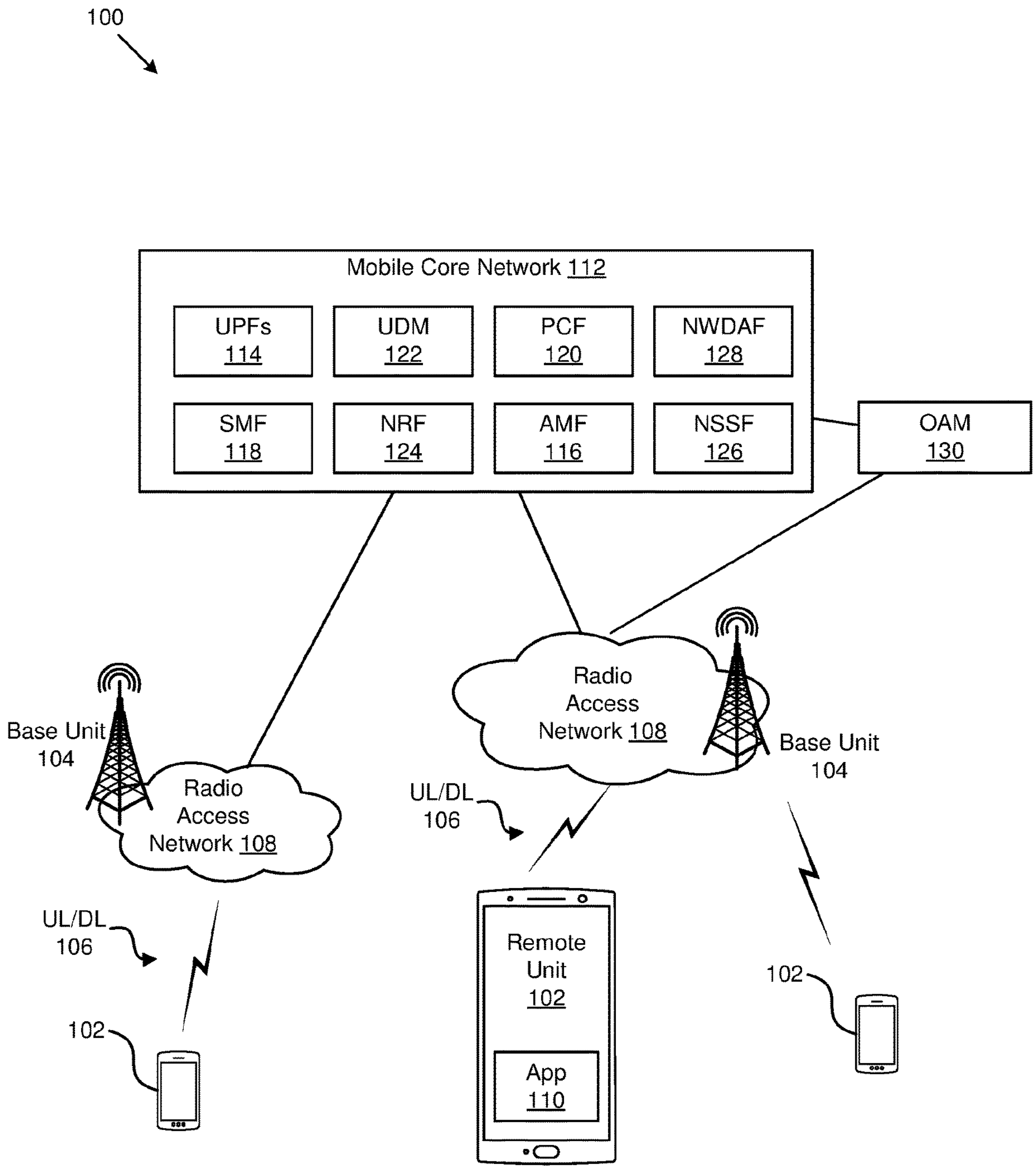
FIG. 1 is a schematic block diagram illustrating one embodiment of a wireless communication system for checking a feasibility of a goal for automation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a digital twin for software testing. In one embodiment, the wireless communication system 100 includes remote units 102 and network units 104 (e.g., base units). Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL and/or DL communication signals 106. In certain embodiments, the remote units 102 may communicate directly with other remote units 102 via sidelink communication. The remote units 102 may include one or more software applications 110.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), a session management function ("SMF"), a user plane function ("UPF"), an application function, an authentication server function ("AUSF"), security anchor functionality ("SEAF"), trusted non-3GPP gateway function ("TNGF"), a network function, a digital twin creation service producer, a testing management service producer, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols, 5G Core, 5G Management and 5G Applications standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

The network units 104 may be part of a radio access network 108. Moreover, the radio access network 108 may communicate with a mobile core network 112. Further, the mobile core network 112 may include one or more network functions, such as UPFs 114, an AMF 116, an SMB 118, a PCT 120, a UDM 122, a network repository function ("NRF") 124, an NSSF 126, and a network data analytics function ("NWDAF") 128. The mobile core network 112 and/or the radio access network 108 are managed by the operations and management system ("OAM") 130.

In various embodiments, a remote unit 102 may transmit, from a consumer device, a request to a network device for checking a feasibility of a goal for automation in the telecommunication network. The goal is decomposable into a set of configurable conditions, a set of subgoals, or a combination thereof. In some embodiments, the remote unit 102 may receive a response from the network device based on whether the set of configurable conditions, the set of subgoals, or the combination thereof are able to be set in the telecommunication network. Accordingly, the remote unit 102 may be used for checking a feasibility of a goal for automation.

In certain embodiments, a network unit 104 may receive, at a network device, a request from a consumer device for checking a feasibility of a goal for automation in the telecommunication network. In some embodiments, the network unit 104 may decompose the goal into a set of configurable conditions, a set of subgoals, or a combination thereof. In certain embodiments, the network unit 104 may determine whether the set of configurable conditions, the set of subgoals, or the combination thereof are able to be set in the telecommunication network. In various embodiments, the network unit 104 may transmit a response to the consumer device based on whether the set of configurable conditions, the set of subgoals, or the combination thereof are able to be set in the telecommunication network. Accordingly, the network unit 104 may be used for checking a feasibility of a goal for automation.

Figure 2:
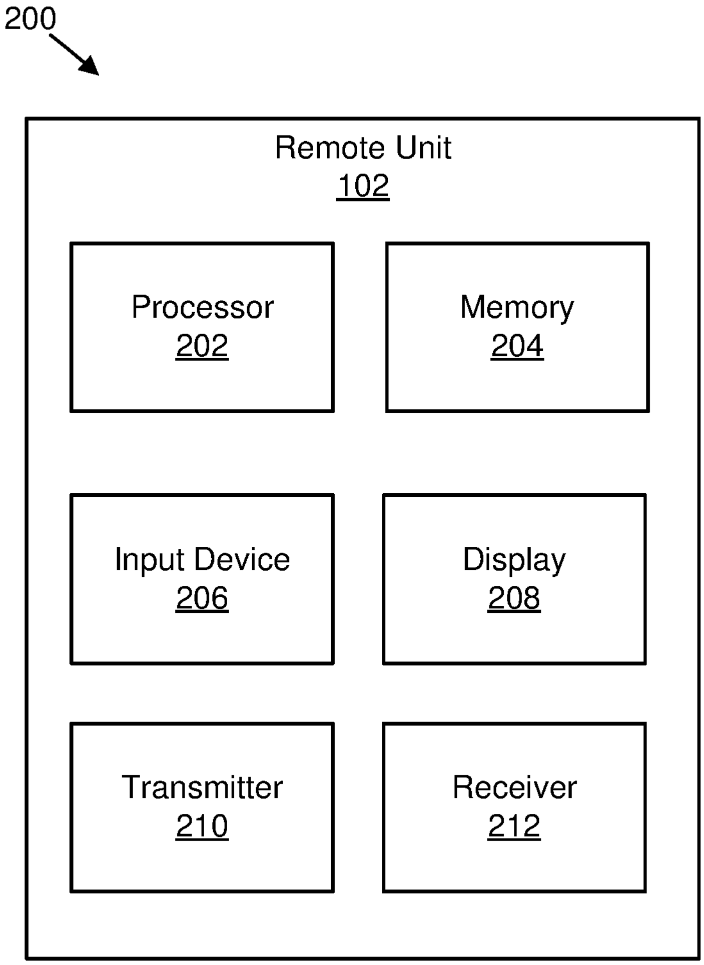
FIG. 2 is a schematic block diagram illustrating one embodiment of an apparatus that may be used for checking a feasibility of a goal for automation.

FIG. 2 depicts one embodiment of an apparatus 200 that may be used for checking a feasibility of a goal for automation. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 transmits a request to a network device for checking a feasibility of a goal for automation in the telecommunication network. The goal is decomposable into a set of configurable conditions, a set of subgoals, or a combination thereof. In various embodiments, the receiver 212 receives a response from the network device based on whether the set of configurable conditions, the set of subgoals, or the combination thereof are able to be set in the telecommunication network.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
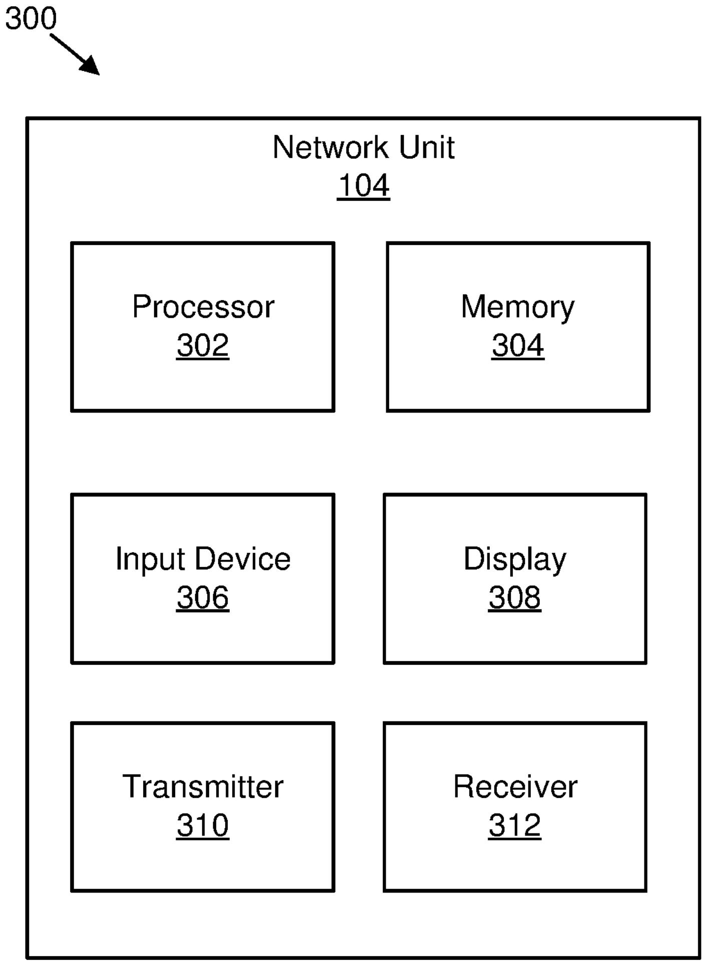
FIG. 3 is a schematic block diagram illustrating one embodiment of an apparatus that may be used for checking a feasibility of a goal for automation.

FIG. 3 depicts one embodiment of an apparatus 300 that may be used for checking a feasibility of a goal for automation. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives a request from a consumer device for checking a feasibility of a goal for automation in the telecommunication network. In various embodiments, the processor 302: decomposes the goal into a set of configurable conditions, a set of subgoals, or a combination thereof; and determines whether the set of configurable conditions, the set of subgoals, or the combination thereof are able to be set in the telecommunication network. In certain embodiments, the transmitter 310 transmits a response to the consumer device based on whether the set of configurable conditions, the set of subgoals, or the combination thereof are able to be set in the telecommunication network.

It should be noted that one or more embodiments described herein may be combined into a single embodiment.

In certain embodiments, closed loops may be configured with automation goals that the closed loops try to meet. In such embodiments, a configuration is done by any appropriate consumer that is authorized to configure such goals. In some embodiments, there may be loops specified by a different consumer (e.g., different verticals industries), different tenants, different network slice owners, and so forth. In addition to different consumers, goals may be specified at different levels of a managed entity stack or a policy continuum and may need to be translated to different levels in a managed entity stack or a policy continuum. In such embodiments, there is a possibility that such translation or different consumers cause conflicting goals to be configured into a system, such conflicts could cause translated goals or conditions (e.g., goals or conditions that are derived from the original goal) to be set in some domains and fail in other domains leading to inconsistent state of the goal setting procedure.

In various embodiments, fifth generation ("5G") uses network slicing with the intention that the operator can support different services for different vertical customers (e.g., automobiles (e.g., vehicle to everything ("V2X")), internet of things ("IoT"), enhanced mobile broadband ("eMBB"), Industry 4.0 (e.g., ultra-reliable low-latency communication ("URLLC"))). The network slices may be hosted over a virtualized infrastructure across management domains. In certain embodiments, automation of a network may focus on closed loops as a key enabler for achieving automation. Each assurance control loop may include one or more assurance goals (or closed loop goals) and many closed loops ("CLs") may act on a network slice or a network slice subnet.

In certain embodiments, assurance goals corresponding to a CL may be set by any authorized CL consumer and includes an assurance target list which may be is a list of name-value pairs that indicate a key performance indicator ("KPI") goal that the closed loop should try to achieve (e.g., assurance goal or control loop goal ("CLG")). These goals may be any optimization related criterion (e.g., maximum and/or minimum), an inequality (e.g., less than or greater than) or an equality constraint (e.g., name=value as currently specified), and may be expressed as part of an intent. Different entities may set different goals at different levels. These goals may be delegated and escalated or handed over to other different closed loops. Different consumers (e.g., responsible for different network slice instances or different network slice subnet instances) may set different goals for a condition listening service ("CLS") responsible for their network slice instances. However, these may then be delegated to other closed loops that are in different management domains (e.g., management domains).

In some embodiments, since there are different goals set by different consumers of different slices over a common shared infrastructure there is a chance that different goals may conflict with each other.

In various embodiments, prior to setting a goal, a feasibility analysis of goals configurability in a network should be carried out.

Figure 4:
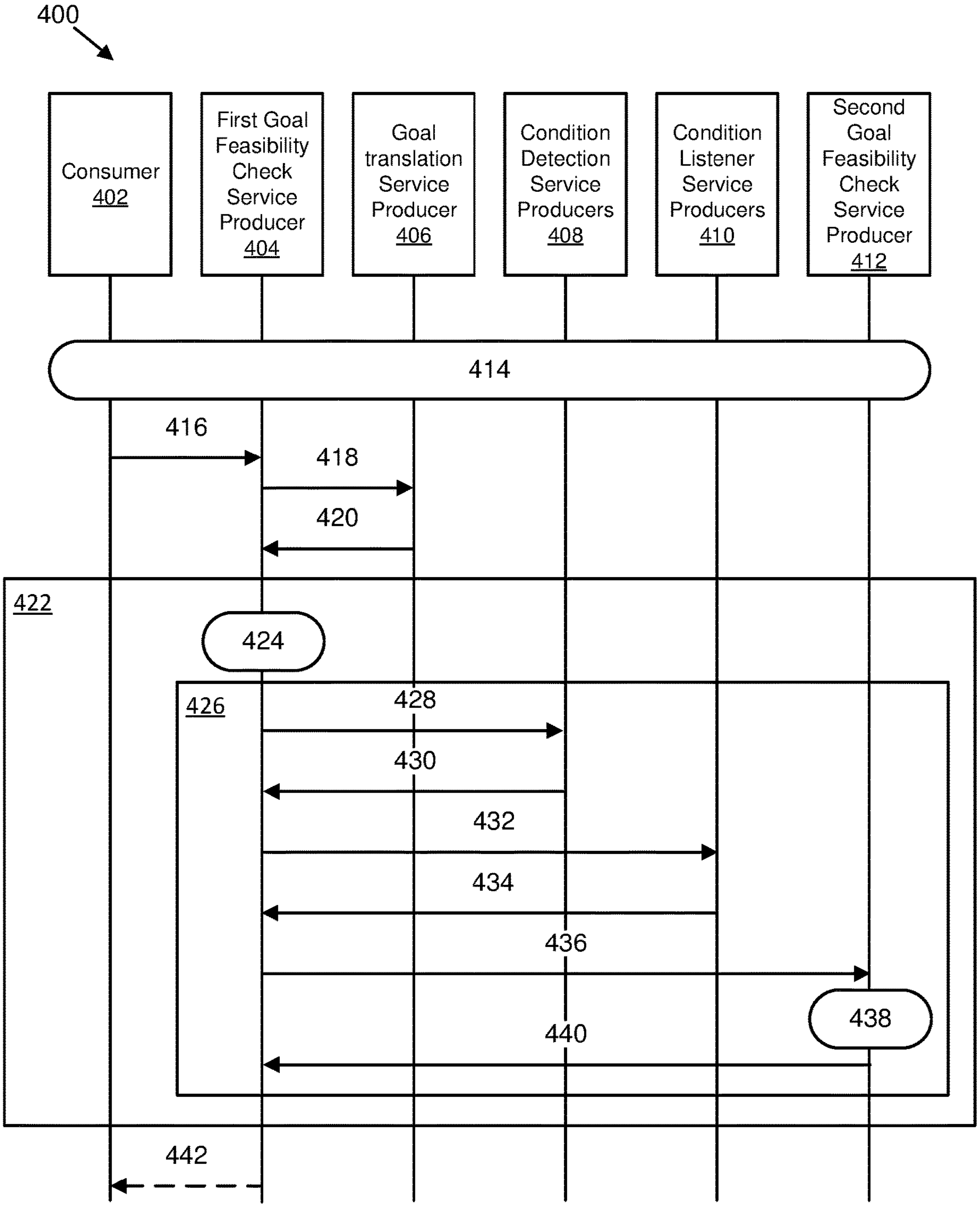
FIG. 4 is a schematic block diagram illustrating one embodiment of a system for a feasibility check of a goal.

FIG. 4 is a schematic block diagram illustrating one embodiment of a system 400 for a feasibility check of a goal. The system 400 includes a consumer 402, a first goal feasibility check service producer ("GFCSP") 404, a goal translation service producer ("GTSP") 406, condition detection service producers ("CDSPs") 408, condition listener service producer ("CLSP") 410, and a second GFCSP 412. Each of the communications in the system 400 may include one or more messages.

The first GFCSP 404 and/or second GFCSP 412 may: 1) receive requests for checking if a goal is configurable in the network; 2) if the goal is configurable in the network, optionally reserve the goal for a given time (e.g., reserving a goal means that the goal is compared with newer goals); and 3) if the goal is not configurable in the network, provide reasons why the goal is not settable. For example, the reasons why the goal is not settable may include: 1) an existence of conflicting goals set; 2) an incorrect request for listeners of a condition in the network or listeners being unreachable; 3) translated goals are not feasible in the network; and/or 4) a goal or condition being impossible to reach. It should be noted that feasibility may include checking for conflict. A separate functionality identical to a feasibility check may be used to only check for conflicts.

In a first communication 414, there may be a mapping of a goal to conditions and translated goals configured in the system 400.

In a second communication 416, the consumer 402 requests to check a feasibility of setting an assurance goal in the first GFCSP 404. The check of the assurance goal implies that the consumer 402 is only requesting to know that a particular goal can be set in the network. The check request may include a request for reserving the goal if possible.

In a third communication 418, the first GFCSP 404 transmits an assurance goal list to the goal translation service producer 406. The third communication 418 may include a request for translating or decomposing goals to sub-goals. The GTSP 406, in one implementation, could look up a translation table to figure out associated sub-goals and an entity that could be used to set those goals (e.g., a condition detection service or another CL governance service producer). The translation of goals by the GTSP 406 may be: 1) based on a vendor specific implementation of the goals; 2) based on a technology specific understanding of the goals; and/or 3) based on operator configured translations in the database or operator specific implementation.

In a fourth communication 420, the GTSP 406, based on its understanding of the assurance goals (e.g., service level agreement ("SLA"), service level specification ("SLS")), provides the list of internally configurable conditions or configurable goals and the entities (e.g., CDSP or another GFCSP) where they can be checked for feasibility. The GTSP 406 may translate goals across management domain capabilities of setting goals including translating goals across multi-technology or multi-vendor platforms.

A loop 422 may be performed for each goal and/or subgoal from the third communication 418 and/or fourth communication 420 while there are more entities or not check is negative.

The first GFCSP 404 evaluates 424 a type of address and/or entity where a goal is to be set and an exact address of the entity.

In a sub-procedure 426 if condition: 1) in a fifth communication 428, if a condition is to be set, then a request is sent to a CDSP of the CDSPs 408 to check if the condition is settable—if reservation is requested, then the condition is reserved (e.g., but not set) for the provided time; 2) in a sixth communication 430, an acknowledgement of condition set check is sent; 3) in a seventh communication 432 (e.g., optional communication), in some cases, it may be required to check if the condition listening service producers 410 can receive the notifications issued by the CDSP—for example, to check if the subscription address for notifications of the CDSP is reachable by the first GFCSP 404; and 4) in an eighth communication 434 (e.g., optional communication), an acknowledgement of listener set check is sent.

In a sub-procedure 426 else if condition: 1) in a ninth communication 436, if a translated or decomposed goal must be set in the second GFCSP 412, a goal feasibility check request is sent to the second GFCSP 412—in certain embodiments, the second GFCSP 412 is a logical entity and the first GFCSP 404 may sending the request to itself; 2) the second GFCSP 412 recursively repeats 438 a feasibility check procedure; and 3) in a tenth communication 440, a positive or negative acknowledgement is sent after the feasibility of the goal is checked.

In an optional eleventh communication 442, a final set response is sent to the consumer 402 (e.g., goal check response). It should be noted that a reserved condition is a condition that ensures that additional conditions that conflict with a reserved condition cannot be set in the CDSP. The detection of this condition is, however, not activated in the network and therefore no notifications with respect to the condition being met are issued. A reserved goal is handled in the same manner.

Figure 5:
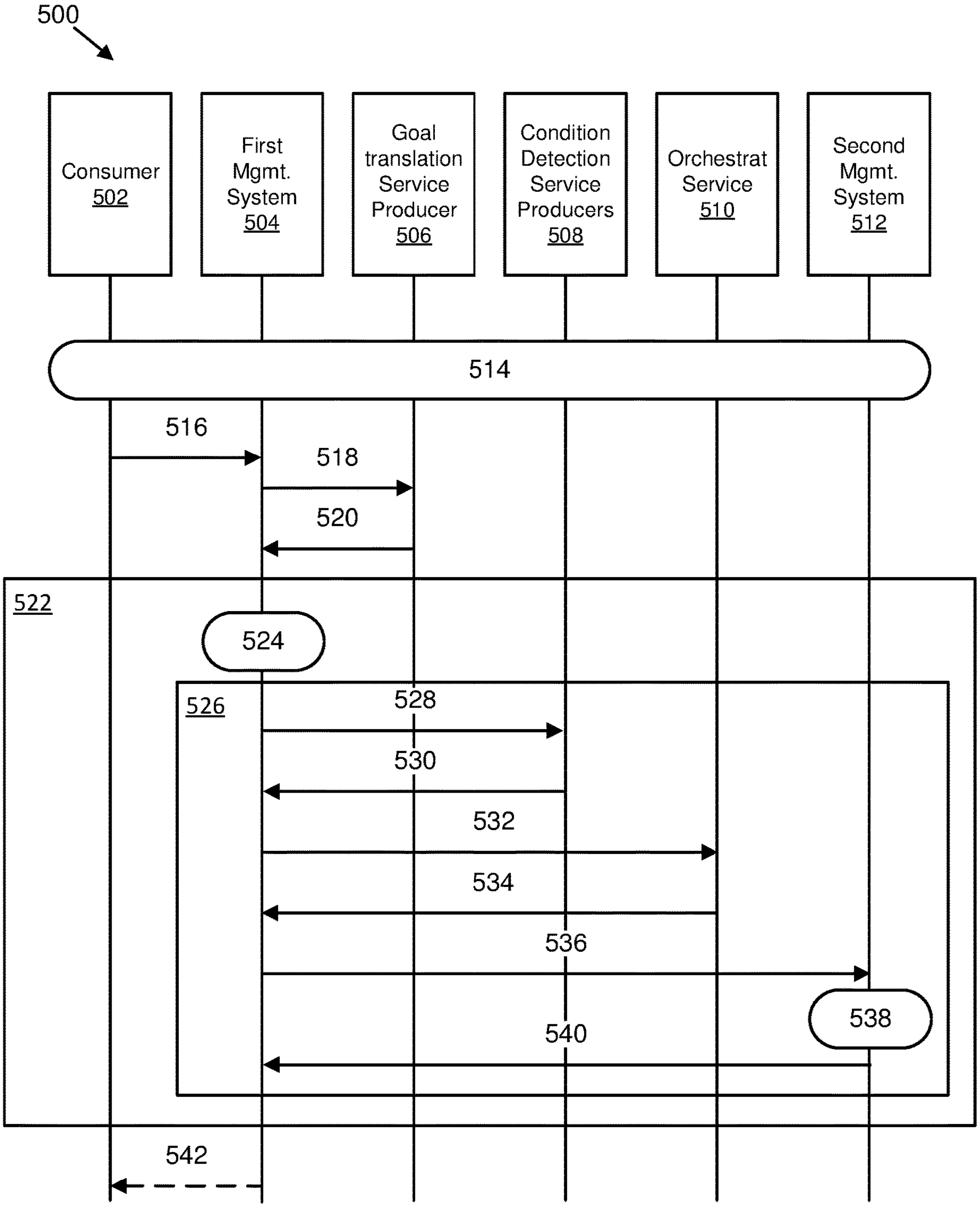
FIG. 5 is a schematic block diagram illustrating one embodiment of a system for a goal feasibility check in an ETSI ZSM framework network.

FIG. 5 is a schematic block diagram illustrating one embodiment of a system 500 for a goal feasibility check in a European telecommunications standards institute ("ETSI") zero-touch network and service management ("ZSM") framework network. The system 500 includes a consumer 502, a first management system 504 (e.g., end-to-end ("E2E") management device ("MD") management system acting as a GFCSP), a GTSP 506, CDSPs 508, an orchestration service 510 (e.g., acting as a CLSP), and a second management system 512 (e.g., acting as a second GFCSP). Each of the communications in the system 500 may include one or more messages.

The management system at the E2E level (e.g., E2E MDMs ("E2EMDMs")) as well as the mobile device ("MD") level (e.g., mobile device management ("MDM")) provides a goal feasibility check service ("GFCS") implementation and therefore plays the role of a GFCSP. The condition detection service producer provides the setting of conditions as described in the condition detection service on ETSI ZSM and plays the role of the CDSP. Further, an orchestration service producer ("OSP") plays the role of a CLSP.

In a first communication 514, there may be a mapping of a goal to conditions and translated goals configured in the system 500.

In a second communication 516, the consumer 502 requests to check a feasibility of setting an automation goal in the first management system 504. The check of the goal implies that the consumer 502 is only requesting to know that a particular goal can be set in the network. The check request may include a request for reserving the goal for a certain time.

In a third communication 518, the first management system 504 requests for translating or decomposing goals to sub-goals.

In a fourth communication 520, the GTSP 506, based on its understanding of the assurance goals (e.g., service level agreement ("SLA"), service level specification ("SLS")), provides the list of internally configurable conditions or configurable goals and the entities (e.g., CDSP or another management system) where they can be checked. The GTSP 506 may translate goals across management domain capabilities of setting goals including translating goals across multi-technology or multi-vendor platforms.

A loop 522 may be performed for each goal and/or subgoal from the third communication 518 and/or fourth communication 520 while there are more entities or not check is negative.

The first management system 504 evaluates 524 a type of address and/or entity where a goal is to be set and an exact address of the entity.

In a sub-procedure 526 if condition: 1) in a fifth communication 528, if a condition is to be set, then a request is sent to a CDSP of the CDSPs 508 to check if the condition is settable—if reservation is requested, then the condition is reserved (e.g., but not set) for the provided time; 2) in a sixth communication 530, an acknowledgement of condition set check is sent; 3) in a seventh communication 532 (e.g., optional communication), in some cases, it may be required to check if the condition listening service producers can receive the notifications issued by the CDSP—for example, to check if the subscription address for notifications of the CDSP is reachable by the first management system 504 with the orchestration service 510 (e.g., OSP) if it can subscribe to notifications from the CLSP corresponding to the set condition; and 4) in an eighth communication 534 (e.g., optional communication), an acknowledgement of listener set check is sent.

In a sub-procedure 526 else if condition: 1) in a ninth communication 536, if a translated or decomposed goal must be set in the second management system 512, a goal feasibility check request is sent to the second management system 512; 2) the second management system 512 recursively repeats 538 a feasibility check procedure; and 3) in a tenth communication 540, a positive or negative acknowledgement is sent after the feasibility of the goal is checked.

In an optional eleventh communication 542, a final positive or negative set response is sent to the consumer 502 (e.g., goal check response).

Figure 6:
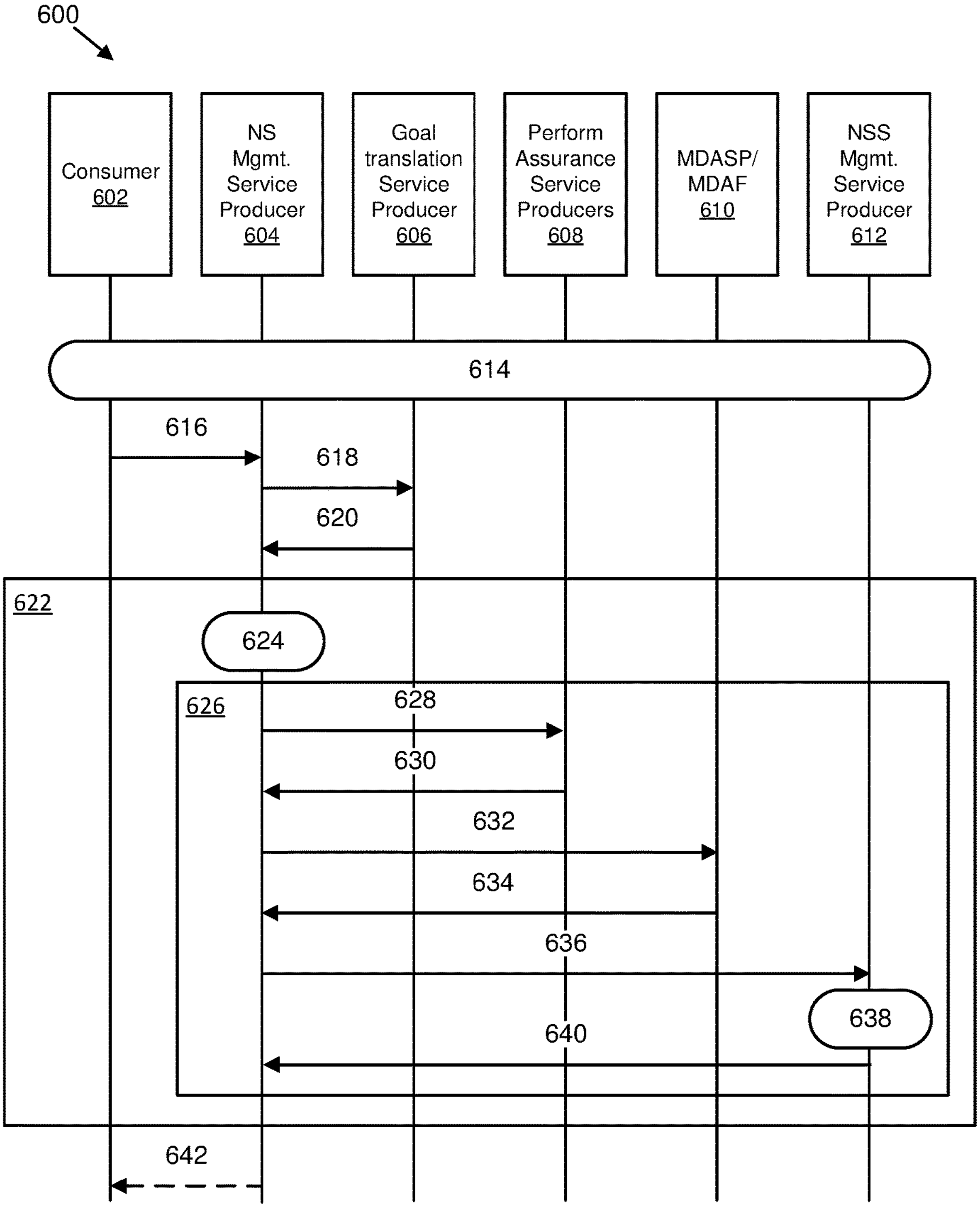
FIG. 6 is a schematic block diagram illustrating one embodiment of a system for a goal feasibility check in a 3GPP management system.

FIG. 6 is a schematic block diagram illustrating one embodiment of a system 600 for a goal feasibility check in a 3GPP management system. The system 600 includes a consumer 602, a network slice ("NS") management service producer ("NSMSP") 604 (e.g., acting as a GFCSP), a GTSP 606, performance assurance service producers ("PASPs") 608 (e.g., acting as CDSP), management data analytics service producer ("MDASP") and/or management data analytics function ("MDAF") ("MDASP/MDAF") 610 (e.g., acting as a CLSP), and a network switching subsystem ("NSS") management service producer ("NSSMSP") 612 (e.g., acting as a second GFCSP). Each of the communications in the system 600 may include one or more messages.

In FIG. 6, a management service producer at the network slice level ("NSMSP") as part of a 3GPP compliant management system handles assurance goal feasibility check (e.g., therefore the NMSP acts as the GFCSP). The management service producer may be a provisioning service producer responsible for configuring a network slice based on a service profile that include an SLA, an SLS, or goal specifications. A performance assurance service producer acts as the CDSP where respective conditions relating to a CL goal can be set. An MDAS acts as the handler for triggered conditions therefore as the CLSP. Moreover, a network slice subnet management service producer ("NSSMSP") acts as the second GFCSP, for example, for the radio access network ("RAN") part of the network slice instance.

In a first communication 614, there may be a mapping of a goal to conditions and translated goals configured in the system 600.

In a second communication 616, the consumer 602 requests to check a feasibility of configuring an assurance and/or automation goal in the NSMSP 604. The check of the assurance goal implies that the consumer 602 is only requesting to know that a particular goal can be set in the network. The check request may include a request for reserving the goal for a certain time.

In a third communication 618, the NSMSP 604 requests for translating or decomposing goals to sub-goals.

In a fourth communication 620, the GTSP 606, based on its understanding of the assurance goals (e.g., service level agreement ("SLA"), service level specification ("SLS")), provides the list of internally configurable conditions or configurable goals and the entities (e.g., CDSP or another management system) where they can be checked. The GTSP 606 may translate goals across management domain capabilities of setting goals including translating goals across multi-technology or multi-vendor platforms.

A loop 622 may be performed for each goal and/or subgoal from the third communication 618 and/or fourth communication 620 while there are more entities or not check is negative.

The first management system 604 evaluates 624 a type of address and/or entity where a goal is to be set and an exact address of the entity.

In a sub-procedure 626 if condition: 1) in a fifth communication 628, if a condition is to be set, then a request is sent to a CDSP of the performance assurance service producers 608 to check if the condition is settable—in 3GPP, an example of a condition could be a key performance indicator ("KPI") threshold crossing condition—if reservation is requested, then the condition is reserved (e.g., but not set) for the provided time; 2) in a sixth communication 630, an acknowledgement of condition set check is sent; 3) in a seventh communication 632 (e.g., optional communication), in some cases, it may be required to check if the condition listening service producers can receive the notifications issued by the CDSP—for example, to check if the subscription address for notifications of the PASP 608 is reachable by the MDASP/MDAF 610; and 4) in an eighth communication 634 (e.g., optional communication), an acknowledgement of listener set check is sent.

In a sub-procedure 626 else if condition: 1) in a ninth communication 636, if a translated or decomposed goal must be set in the NSSMSP 612, a goal feasibility check request is sent to the NSSMSP 612; 2) the NSSMSP 612 recursively repeats 638 a feasibility check procedure; and 3) in a tenth communication 640, a positive or negative acknowledgement is sent after the feasibility of the goal is checked.

Figure 7:
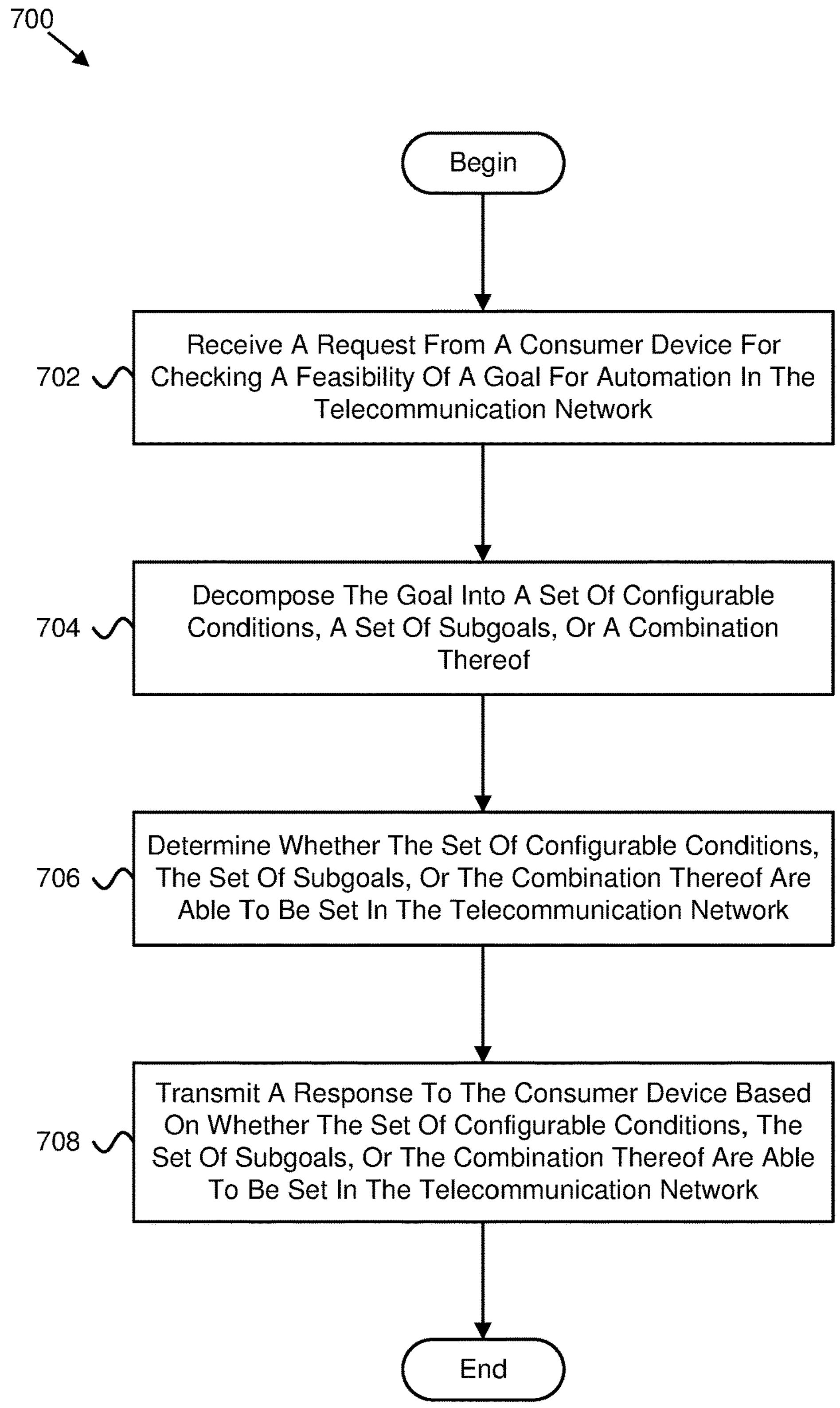
FIG. 7 is a flow chart diagram illustrating one embodiment of a method for checking a feasibility of a goal for automation.

FIG. 7 is a flow chart diagram illustrating one embodiment of a method 700 for checking a feasibility of a goal for automation. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702, at a network device, a request from a consumer device for checking a feasibility of a goal for automation in the telecommunication network. In some embodiments, the method 700 includes decomposing 704 the goal into a set of configurable conditions, a set of subgoals, or a combination thereof. In certain embodiments, the method 700 includes determining 706 whether the set of configurable conditions, the set of subgoals, or the combination thereof are able to be set in the telecommunication network. In various embodiments, the method 700 includes transmitting 708 a response to the consumer device based on whether the set of configurable conditions, the set of subgoals, or the combination thereof are able to be set in the telecommunication network.

In certain embodiments, the goal comprises: a list of name-value pairs that indicate a key performance indicator (KPI) goal; an assurance goal; a control loop goal; a maximum criteria; a minimum criteria; an inequality; an equality constraint; a portion of an intent; or some combination thereof. In some embodiments, the method 700 further comprising determining a set of actions to be performed in response to the goal not being met. In various embodiments, the method 700 further comprising determining whether there are: conflicting goals corresponding to the goal; unsettable goals corresponding to the goal; conflicting conditions corresponding to the goal; unsettable conditions corresponding to the goal; unconfigurable entities corresponding to the goal; or some combination thereof.

In one embodiment, the request comprises a limited reservation time corresponding to the goal. In certain embodiments, a reservation for the goal is removed in response to the limited reservation time elapsing. In some embodiments, the network device comprises a goal feasibility check service producer, a management system, a management service producer, or some combination thereof.

Figure 8:
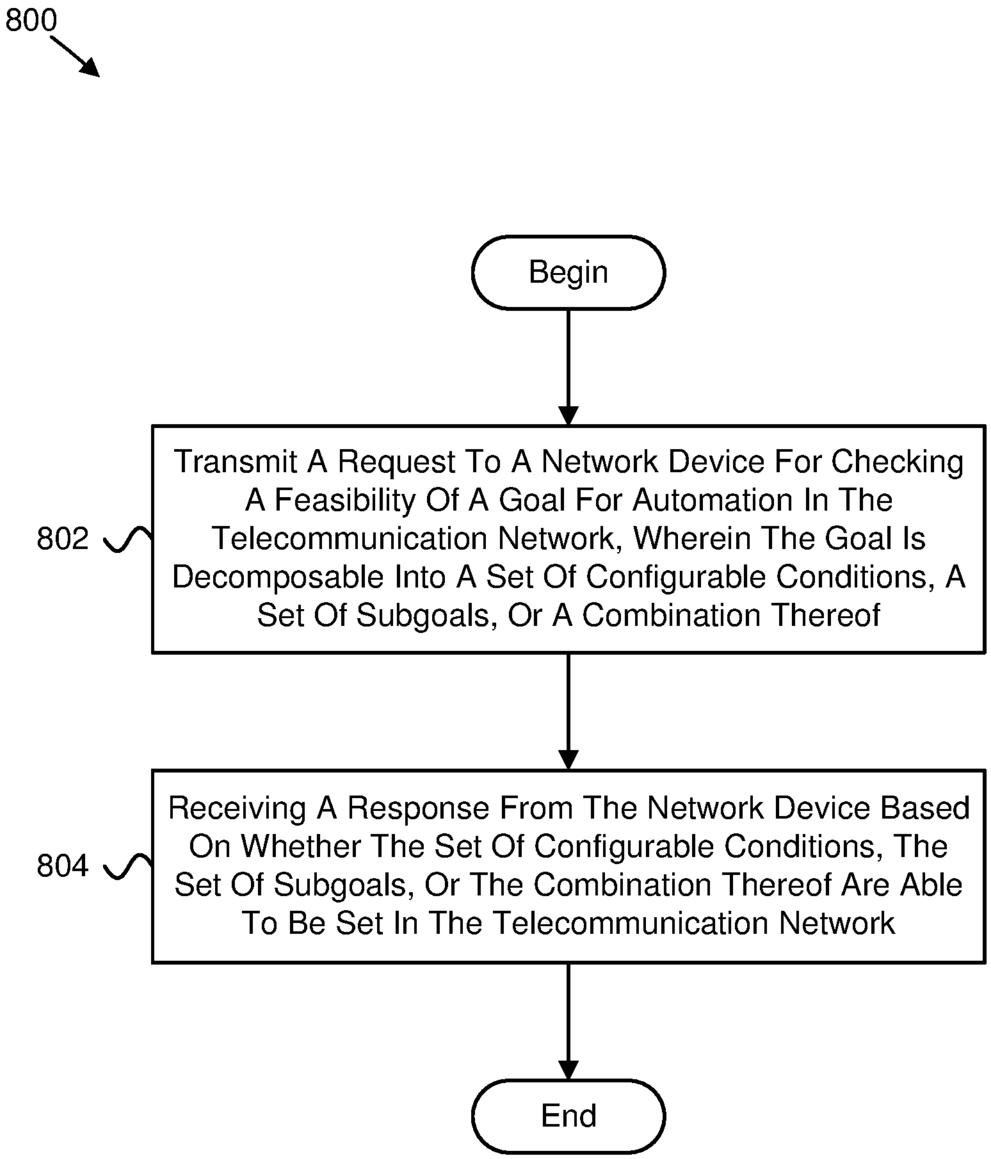
FIG. 8 is a flow chart diagram illustrating another embodiment of a method for checking a feasibility of a goal for automation.

FIG. 8 is a flow chart diagram illustrating another embodiment of a method 800 for checking a feasibility of a goal for automation. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes transmitting 802, from a consumer device, a request to a network device for checking a feasibility of a goal for automation in the telecommunication network. The goal is decomposable into a set of configurable conditions, a set of subgoals, or a combination thereof. In some embodiments, the method 800 includes receiving 804 a response from the network device based on whether the set of configurable conditions, the set of subgoals, or the combination thereof are able to be set in the telecommunication network.

In certain embodiments, the goal comprises: a list of name-value pairs that indicate a key performance indicator (KPI) goal; an assurance goal; a control loop goal; a maximum criteria; a minimum criteria; an inequality; an equality constraint; a portion of an intent; or some combination thereof. In some embodiments, the request comprises a limited reservation time corresponding to the goal.

In various embodiments, a reservation for the goal is removed in response to the limited reservation time elapsing. In one embodiment, the network device comprises a goal feasibility check service producer, a management system, a management service producer, or some combination thereof.

In one embodiment, an apparatus comprising a network device in a telecommunication network. The apparatus further comprises: a receiver that receives a request from a consumer device for checking a feasibility of a goal for automation in the telecommunication network; a processor that: decomposes the goal into a set of configurable conditions, a set of subgoals, or a combination thereof; and determines whether the set of configurable conditions, the set of subgoals, or the combination thereof are able to be set in the telecommunication network; and a transmitter that transmits a response to the consumer device based on whether the set of configurable conditions, the set of subgoals, or the combination thereof are able to be set in the telecommunication network.

In certain embodiments, the goal comprises: a list of name-value pairs that indicate a key performance indicator (KPI) goal; an assurance goal; a control loop goal; a maximum criteria; a minimum criteria; an inequality; an equality constraint; a portion of an intent; or some combination thereof.

In some embodiments, the processor determines a set of actions to be performed in response to the goal not being met.

In various embodiments, the processor determines whether there are: conflicting goals corresponding to the goal; unsettable goals corresponding to the goal; conflicting conditions corresponding to the goal; unsettable conditions corresponding to the goal; unconfigurable entities corresponding to the goal; or some combination thereof.

In one embodiment, the request comprises a limited reservation time corresponding to the goal.

In certain embodiments, a reservation for the goal is removed in response to the limited reservation time elapsing.

In some embodiments, the network device comprises a goal feasibility check service producer, a management system, a management service producer, or some combination thereof.

In one embodiment, a method of a network device in a telecommunication network comprises: receiving a request from a consumer device for checking a feasibility of a goal for automation in the telecommunication network; decomposing the goal into a set of configurable conditions, a set of subgoals, or a combination thereof; determining whether the set of configurable conditions, the set of subgoals, or the combination thereof are able to be set in the telecommunication network; and transmitting a response to the consumer device based on whether the set of configurable conditions, the set of subgoals, or the combination thereof are able to be set in the telecommunication network.

In certain embodiments, the goal comprises: a list of name-value pairs that indicate a key performance indicator (KPI) goal; an assurance goal; a control loop goal; a maximum criteria; a minimum criteria; an inequality; an equality constraint; a portion of an intent; or some combination thereof.

In some embodiments, the method further comprising determining a set of actions to be performed in response to the goal not being met.

In various embodiments, the method further comprising determining whether there are: conflicting goals corresponding to the goal; unsettable goals corresponding to the goal; conflicting conditions corresponding to the goal; unsettable conditions corresponding to the goal; unconfigurable entities corresponding to the goal; or some combination thereof.

In one embodiment, the request comprises a limited reservation time corresponding to the goal.

In certain embodiments, a reservation for the goal is removed in response to the limited reservation time elapsing.

In some embodiments, the network device comprises a goal feasibility check service producer, a management system, a management service producer, or some combination thereof.

In one embodiment, an apparatus comprises a consumer device in a telecommunication network. The apparatus further comprises: a transmitter that transmits a request to a network device for checking a feasibility of a goal for automation in the telecommunication network, wherein the goal is decomposable into a set of configurable conditions, a set of subgoals, or a combination thereof; and a receiver that receives a response from the network device based on whether the set of configurable conditions, the set of subgoals, or the combination thereof are able to be set in the telecommunication network.

In certain embodiments, the goal comprises: a list of name-value pairs that indicate a key performance indicator (KPI) goal; an assurance goal; a control loop goal; a maximum criteria; a minimum criteria; an inequality; an equality constraint; a portion of an intent; or some combination thereof.

In some embodiments, the request comprises a limited reservation time corresponding to the goal.

In various embodiments, a reservation for the goal is removed in response to the limited reservation time elapsing.

In one embodiment, the network device comprises a goal feasibility check service producer, a management system, a management service producer, or some combination thereof.

In one embodiment, a method of a consumer device in a telecommunication network comprises: transmitting a request to a network device for checking a feasibility of a goal for automation in the telecommunication network, wherein the goal is decomposable into a set of configurable conditions, a set of subgoals, or a combination thereof; and receiving a response from the network device based on whether the set of configurable conditions, the set of subgoals, or the combination thereof are able to be set in the telecommunication network.

In certain embodiments, the goal comprises: a list of name-value pairs that indicate a key performance indicator (KPI) goal; an assurance goal; a control loop goal; a maximum criteria; a minimum criteria; an inequality; an equality constraint; a portion of an intent; or some combination thereof.

In some embodiments, the request comprises a limited reservation time corresponding to the goal.

In various embodiments, a reservation for the goal is removed in response to the limited reservation time elapsing.

In one embodiment, the network device comprises a goal feasibility check service producer, a management system, a management service producer, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for performing a network function in a telecommunication network, the apparatus comprising:

at least one memory; and at least one processor coupled with the at least one memory and configured to cause the apparatus to:

receive a request from a consumer device for checking a feasibility of a goal for automation in the telecommunication network;

decompose the goal into one or more of a set of configurable conditions and a set of subgoals;

transmit a subgoal request for each configurable condition and/or subgoal requesting a determination of whether the configurable condition and/or subgoal is able to be set;

receive responses to the subgoal requests, each response comprising an answer as to whether the configurable condition or subgoal is able to be set;

determine, based on the received responses, whether the set of configurable conditions, the set of subgoals, or the combination thereof are able to be set in the telecommunication network;

in response to determining that the configurable conditions and/or the set of subgoals are able to be set in the telecommunication network, determine whether the configurable conditions and/or the set of subgoals accomplish the goal; and transmit a response to the consumer device based on whether the goal able to be accomplished, the response comprising that the goal is able to be accomplished or that the goal is not able to be accomplished, wherein the response is transmitted prior to action being taken to accomplish the goal.

2. The apparatus of claim 1, wherein the goal comprises:

a list of name-value pairs that indicate a key performance indicator (KPI) goal;

an assurance goal;

a control loop goal;

a maximum criteria;

a minimum criteria;

an inequality;

an equality constraint;

a portion of an intent;

or a combination thereof.

3. The apparatus of claim 1, wherein the at least one processor is configured to cause the apparatus to determine a set of actions to be performed in response to the goal not being met.

4. The apparatus of claim 1, wherein the at least one processor is configured to cause the apparatus to determine whether there are:

conflicting goals corresponding to the goal;

unsettable goals corresponding to the goal;

conflicting conditions corresponding to the goal;

unsettable conditions corresponding to the goal;

unconfigurable entities corresponding to the goal;

or a combination thereof.

5. The apparatus of claim 1, wherein the request comprises a limited reservation time corresponding to one or more configurable conditions and/or subgoals of the goal.

6. The apparatus of claim 5, wherein a reservation for the goal is removed in response to the limited reservation time elapsing.

7. The apparatus of claim 1, further comprising a goal feasibility check service producer, a management system, a management service producer, or a combination thereof.

8. A method of performing a network function in a telecommunication network, the method comprising:

receiving a request from a consumer device for checking a feasibility of a goal for automation in the telecommunication network;

decomposing the goal into one or more of a set of configurable conditions and a set of subgoals;

transmitting a subgoal request for each configurable condition and/or subgoal requesting a determination of whether the configurable condition and/or subgoal is able to be set;

receiving responses to the subgoal requests, each response comprising an answer as to whether the configurable condition or subgoal is able to be set;

determining based on the received responses, whether the set of configurable conditions, the set of subgoals, or the combination thereof are able to be set in the telecommunication network;

in response to determining that the configurable conditions and/or the set of subgoals are able to be set in the telecommunication network, determine whether the configurable conditions and/or the set of subgoals accomplish the goal; and transmitting a response to the consumer device based on whether the goal able to be accomplished, the response comprising that the goal is able to be accomplished or that the goal is not able to be accomplished, wherein the response is transmitted prior to action being taken to accomplish the goal.

9. The method of claim 8, wherein the goal comprises:

a list of name-value pairs that indicate a key performance indicator (KPI) goal;

an assurance goal;

a control loop goal;

a maximum criteria;

a minimum criteria;

an inequality;

an equality constraint;

a portion of an intent;

or a combination thereof.

10. The method of claim 8, further comprising determining a set of actions to be performed in response to the goal not being met.

11. A user equipment (UE) in a telecommunication network, comprising:

at least one memory; and at least one processor coupled with the at least one memory and configured to cause the UE to:

transmit a request to a network device for checking a feasibility of a goal for automation in the telecommunication network, wherein the goal is decomposable into one or more of a set of configurable conditions and a set of subgoals, wherein the network device is configured to:

determine whether the set of configurable conditions, the set of subgoals, or the combination thereof are able to be set in the telecommunication network; and in response to determining that the configurable conditions and/or the set of subgoals are able to be set in the telecommunication network, determine whether the configurable conditions and/or the set of subgoals accomplish the goal; and receive a response from the network device based on whether the goal able to be accomplished, the response comprising that the goal is able to be accomplished or that the goal is not able to be accomplished, wherein the response is transmitted prior to action being taken to accomplish the goal.

12. The UE of claim 11, wherein the goal comprises:

a list of name-value pairs that indicate a key performance indicator (KPI) goal;

an assurance goal;

a control loop goal;

a maximum criteria;

a minimum criteria;

an inequality;

an equality constraint;

a portion of an intent;

or a combination thereof.

13. The UE of claim 11, wherein the request comprises a limited reservation time corresponding to one or more configurable conditions and/or subgoals of the goal.

14. The UE of claim 13, wherein a reservation for the goal is removed in response to the limited reservation time elapsing.

15. The UE of claim 11, wherein the network device comprises a goal feasibility check service producer, a management system, a management service producer, or a combination thereof.

16. A processor for wireless communication in a telecommunication network, comprising:

at least one controller coupled with at least one memory and configured to cause the processor to:

transmit a request to a network device for checking a feasibility of a goal for automation in the telecommunication network, wherein the goal is decomposable into one or more of a set of configurable conditions and a set of subgoals, wherein the network device is configured to:

determine whether the set of configurable conditions, the set of subgoals, or the combination thereof are able to be set in the telecommunication network; and in response to determining that the configurable conditions and/or the set of subgoals are able to be set in the telecommunication network, determine whether the configurable conditions and/or the set of subgoals accomplish the goal; and receive a response from the network device based on whether the goal able to be accomplished, the response comprising that the goal is able to be accomplished or that the goal is not able to be accomplished, wherein the response is transmitted prior to action being taken to accomplish the goal.

17. The processor of claim 16, wherein the goal comprises:

a list of name-value pairs that indicate a key performance indicator (KPI) goal;

an assurance goal;

a control loop goal;

a maximum criteria;

a minimum criteria;

an inequality;

an equality constraint;

a portion of an intent;

or a combination thereof.

18. The processor of claim 16, wherein the request comprises a limited reservation time corresponding to one or more configurable conditions and/or subgoals of the goal.

19. The processor of claim 18, wherein a reservation for the goal is removed in response to the limited reservation time elapsing.

20. The processor of claim 16, wherein the network device comprises a goal feasibility check service producer, a management system, a management service producer, or a combination thereof.

* * * * *